Figure 1:
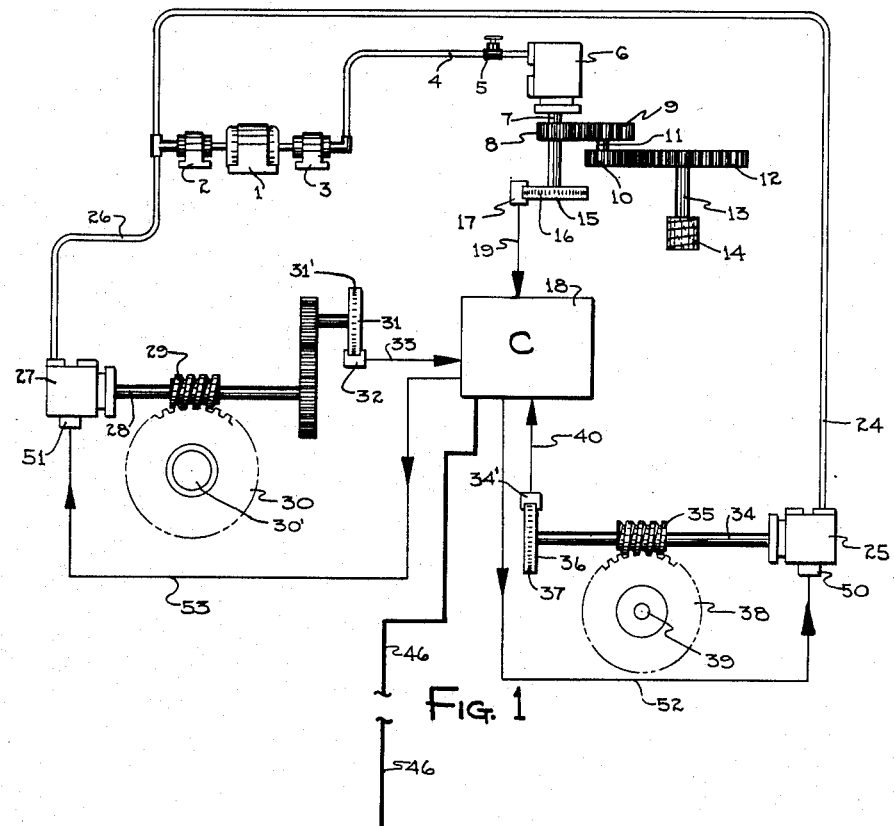

June 7, 1966  J. A. BRADNER  3,254,566
ELECTRONICALLY CONTROLLED FLUID MOTOR POWERED MACHINE TOOL
Filed Dec. 4, 1962  3 Sheets-Sheet 1

JOHN A. BRADNER
*INVENTOR.*

BY
*Atty*

John A. Bradner
INVENTOR.

United States Patent Office 3,254,566
Patented June 7, 1966

3,254,566
ELECTRONICALLY CONTROLLED FLUID MOTOR POWERED MACHINE TOOL
John A. Bradner, Cleveland, Ohio, assignor to The Lees-Bradner Company, Cleveland, Ohio, a corporation of Ohio
Filed Dec. 4, 1962, Ser. No. 242,327
7 Claims. (Cl. 90—4)

This invention relates to machine tools and is more particularly directed to hobbing machines, thread millers or the like incorporating electronics means by which the work spindle, as well as the lead screw, are controlled and rotated in synchronized timed relationship with a hob, cutter or other tool.

As has been well known in this art for a long time now, the reliance upon gearing to establish the rotation of the work spindle and lead screw in timed relationship with that of the hob spindle has been universally accepted as the only means by which a certain degree of accuracy and acceptable efficiency could be obtained. In this respect the patent to Warner No. 2,563,982 is a good example of the required gearing then accepted as a minimum.

In some machine tools of the type referred to, the hob or tool is fed into cutting relation with the rotating workpiece, while in other types, the rotating workpiece is fed into the path of the hob or tool. It is an object of this invention to apply the principles thereof to both types.

It is an object of this invention to construct a control system in which the relative motion about a rotary axis, such as a work spindle or feed means, and along a linear axis such as a lead screw, are synchronized with the rotation or r.p.m. of the hob or cutter.

Another object is to utilize an electronic computer means responsive to the rotation of the hob or cutter, and to provide a selective control by which preselected values may be correlated electronically and transmitted to actuate the lead screw and work spindle in response thereto and to the r.p.m. of the hob or cutter without the use of large and cumbersome change gear trains for such purposes.

A further object is to provide means whereby preselected values such as the lead or helix angle, the feed per revolution of the workpiece and the r.p.m. of the cutter or hob may be established in a centralized electronic computer, correlated, and then transmitted to the lead screw and work spindle, respectively, to effect a selected timed relationship with the r.p.m. of the cutter or hob.

Another object is to independently control the r.p.m. of the cutter or hob while maintaining a selected rotational relationship between the work r.p.m. and lead screw.

Still another object of the invention is to materially increase the rate of cutting or hobbing operations on a workpiece accompanied by an extremely high degree of precision and accuracy.

A further object is to eliminate the necessity of calculating the mathematical formula by which the specifications of a gear to be cut are transposed to change gear ratios which in turn determine the lead, feed and index, thus also eliminating the time factor involved in such manual operations.

Other objects will appear as the following description progresses, reference being made to the accompanying drawings in which like reference characters are employed to designate like parts throughout the same.

Figure 2:
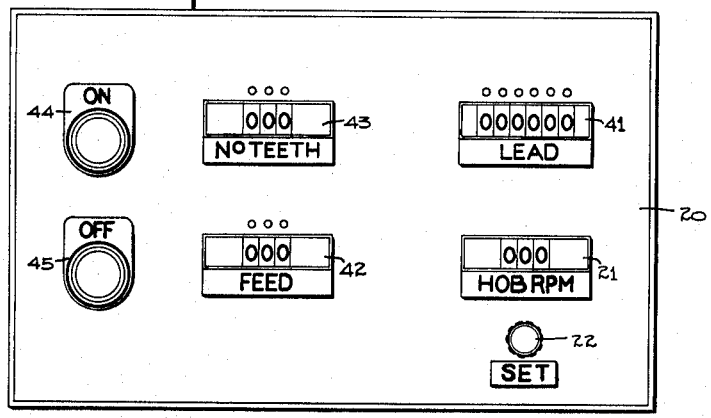
Figure 3:
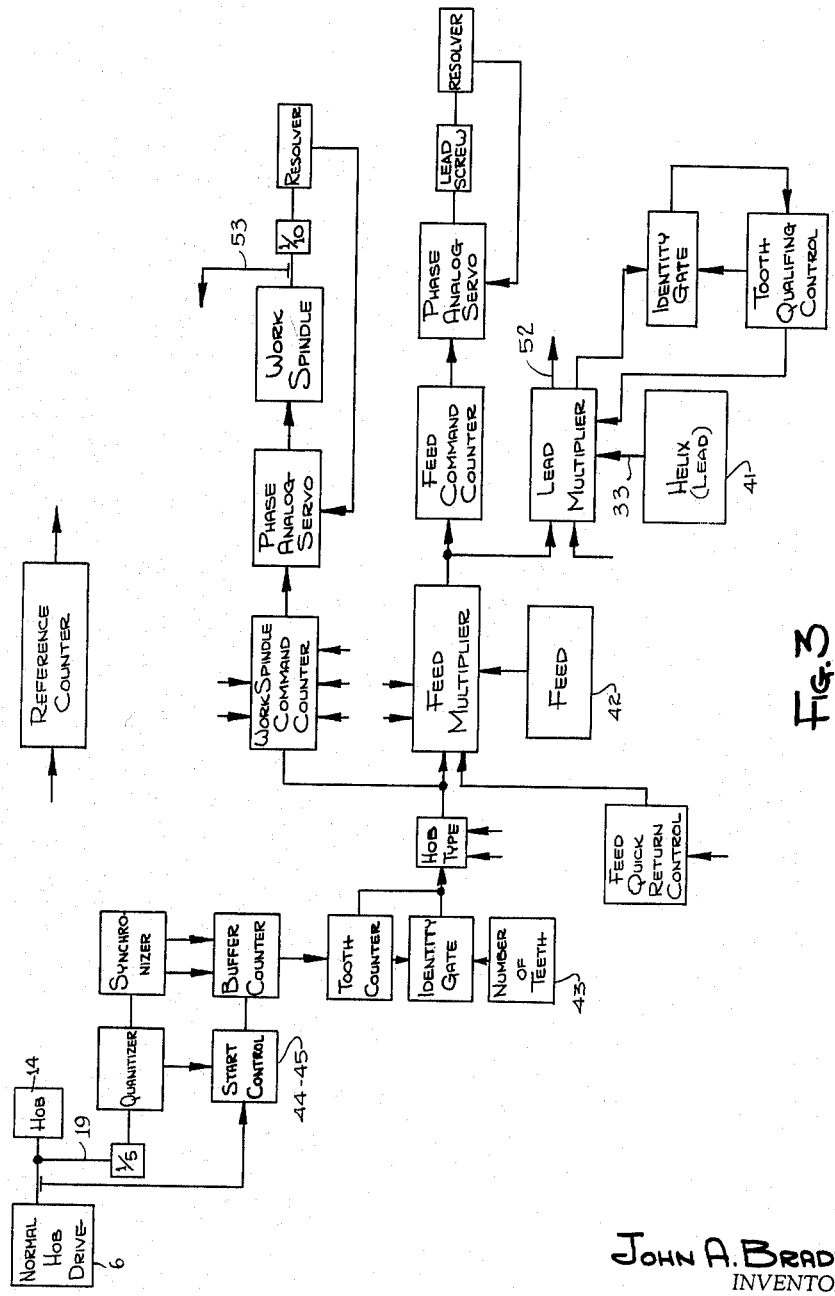
Figure 4:
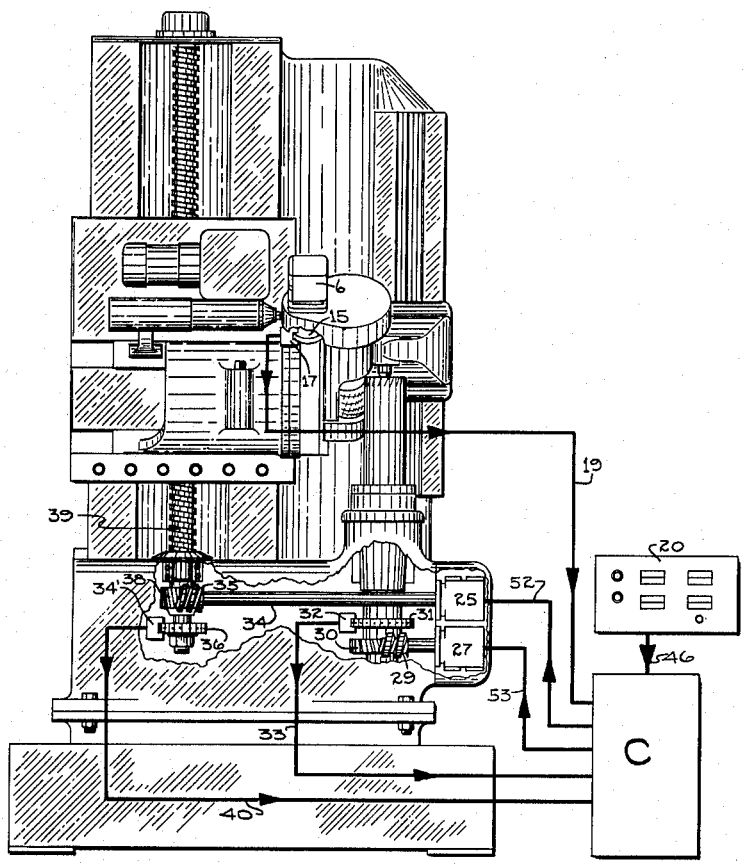

In the drawings:
FIGURE 1 shows in diagrammatic form a hobbing machine or the like and illustrates an electronic computer unit associated therewith according to this invention;

FIGURE 2 illustrates a form of control panel for use with the machine;
FIGURE 3 is a diagrammatic layout of a suitable computer means; and
FIGURE 4 is an elevation of a hobbing machine incorporating my invention.

The present invention, an embodiment of which is illustrated and described herein as applied to hobbing machines, is equally well applicable to other analogous types of machine tools employing a rotary tool and a lead screw and work spindle operating in timed relation to the tool, as in gear or spline finishing, etc.

In the present state of the art, when the workpiece being produced on the conventional hobbing machine is "off lead," it is frequently necessary to adjust for this condition by making the necessary changes in the gear ratios. This process requires some complicated and lengthy mathematical calculations. On the other hand, should such an adjustment be necessary in the present system, it will be made automatically or by the mere turning of a dial, as will appear hereinatfer.

In carrying out my invention, one of the principal objectives is to eliminate much of the mecahnical power transmisison means formerly employed in the form of feed gearing, index gearing, differentials and the like, and at the same time to thereby materially reduce and substantially eliminate the presence of back lash, torque and looseness which will result in a relatively low level of accuracy in the work performed. In place of gear trains and the like, my invention utilizes an electronic computer means C into which signals are delivered corresponding to a preselected r.p.m. of a tool, i.e., hob, together with signals corresponding to a preselected lead and work r.p.m. (index or number of teeth), these signals being correlated within the computer means, and then substantially instantaneously fed back to independent means controlling the lead and work r.p.m., respectively, in timed relation to the r.p.m. of the tool and in response to the preselected values transmitted to the computer means.

The use of an electric motor as a main drive under all conditions of operation would require changing gear ratios each time the hob is changed beyond a given size. Such a motor would be impractical because it would be too big to permit of being mounted on the swiveling portion of the hob head where it could be adjusted angularly and axially of the workpiece. To meet all the speed requirements of this type of work without changing gears would require a motor that is too large to be mounted as mentioned above and also be too expensive.

The use of a hydraulic motor overcomes all of the above disadvantages because its speed can be easily varied over a large range of work without changing gears. Using such a motor with a large diameter hob that takes a slow, deep cut, the motor speed can be lowered accordingly as well as being adjusted to a high speed for use with a small diameter hob that takes a light cut. Such a motor would be small enough to be mounted on the swiveling portion of the hob head where it can be adjusted angularily and axially of the workpiece.

An advantage of using a hydraulic motor and mounting it in the position stated above is that it prevents overspeeding and overtorquing of the gear train as is done in the prior art. This greatly extends the life span of the machine.

More specifically, I have shown diagrammatically in FIGURE 1, a prime mover, such as an electric motor 1 for driving the hydraulic pump 2 and a hydraulic variable displacement pump 3 having connection with a source of hydraulic fluid (not shown), the pump 3 having connection through the conduit 4 and a control and shut-off valve 5 with a variable speed hydraulic motor 6. The output shaft 7 of the motor has a gear 8 keyed to it for transmitting power through the gears 9 and 10 on the stub shaft 11 to rotate the gear 12, shaft 13 and drive the tool 14. The tool 14 is shown as a hob in this embodiment of the invention. The shaft 7 carrying the gear 8 also carries a signal generator 15 which may be in the form of a disc or wheel having a plurality of spaced apart digital signal means 16 about its periphery. An electronic sensing means 17 of suitable known design is disposed closely adjacent the periphery of the wheel to generate electrical signals or impulses in response to the signal means on the wheel as it is rotated and to transmit these signals electrically to the computer C at 18, as indicated by the arrow 19.

No claim of invention is made with respect to the computer C, the signal generators 15, 31, 36 or the signal means 16, 31 and 37 or the sensing device 17, 32, 34' per se, since all of these components are respectively available commercially and are selected because they are of a type suitable for use in carrying out the individual and collective functions intended in the manner and for the purposes disclosed herein. The present invention resides primarily in the particular adaptation, application and functional relationship of such conventional components in such a manner as to obtain synchronization of relative motions of a rotary axis (work spindle or feed means) and a linear axis (lead screw) with the selected timed rotation or r.p.m. of the cutter or hob, and by such means and arrangements to eliminate the use of large and cumbersome change gear trains as has been necessary in the past for such purposes.

In FIGURE 2, there is illustrated a control and indicator panel 20 which may be conveniently mounted on the machine for the use of the operator. At 21 on the panel there is provided an indicator manually set by means of the knob 22 to indicate the selected r.p.m. of the tool or hob. A suitable mechanical connection such as a Bowden wire (not shown) connects the knob and r.p.m. indicator with the control either in the variable speed hydraulic motor 6 or pump 3 to regulate the speed of the motor 6 and thus the r.p.m. of the hob 14.

Referring again to FIGURE 1, the pump 2 is connected by a conduit 24 with a hydraulic motor 25 supplying the lead drive and by a conduit 26 to a hydraulic motor 27 supplying the work drive.

The motor shaft 28 drives the work spindle 30' through the worm and worm wheel 29 and 30, respectively, and also transmits rotary motion to a signal generator 31 similar to the signal generator 15. An electronic signal sensing device 32, similar to the sensing means 17, is provided in close proximity to the periphery of the signal generator 31 to generate electrical impulses in response to the digital signal means 31' on the signal generator 31 as the latter is rotated. These electrical impulses are transmitted to the computer C as indicated by the arrow 33.

To the shaft 34 of the fluid motor 25 is fixed a worm 35 and a signal generating wheel or disk 36 similar to those at 15 and 31 having a digital signal means 37 about its periphery. The worm drives the worm wheel 38 on the lead screw shaft 39. An electrical sensing device 34' similar to those shown at 17 and 32 is disposed closely adjacent the periphery of the signal generator wheel 36 for generating electrical impulses in response to the digital signal means 37 as the wheel is rotated. These impulses are electrically transmitted to the computer C as indicated by the arrow 40.

In FIGURE 3 there is illustrated in diagrammatic style a conventional form of electronic computer means C, such as a type manufactured by The Bendix Corporation of Detroit, Michigan, Industrial Controls Section, into which essential data is electrically transmitted in response to the manually set indicator designations of conventional digital signal means behind the panel (not shown) and appearing in the respective windows of the control panel 20 as, for instance, hob r.p.m. at 21, the selected lead at 41, the hob or cutter feed at 42, and the number of teeth of the workpiece as at 43. "ON" and "OFF" button switches are provided at 44 and 45, respectively, to connect or disconnect the panel with the computer C through the multiple circuit cable 46 conveying the indicated values in the form of electrical impulses to the computer.

The form of electronic computer shown in FIGURE 3 is by way of illustration only of a suitable means by which the values fed to the computer from a manually set means, as in FIGURE 2, may be received, remembered, correlated, resolved and dispatched, for instance, through the servo-motors 50 and 51, to regulate the hydraulic motors 25 and 27, respectively, and thus to regulate the r.p.m. of the lead screw 39 and that of the work spindle 30' in direct response to the respective values fed back to the servo-motors by the computer.

In operation, with the "ON" button 44 depressed and the motor 1 running to drive the hydraulic pumps 2 and 3 and with the control valve 5 set to supply fluid pressure to the variable speed hydraulic motor 6 for driving the hob 14, the knob 22 may be rotated to simultaneously operate the hob r.p.m. tachometer at 21 and through a manual drive such as a Bowden wire (not shown), it is connected with the displacement control of the pump 3 to regulate the speed of the hydraulic motor 6 whereby the hob 14 will be driven at the same r.p.m. selected and indicated at 21.

The lead, feed and number of teeth to be cut indicators at 41, 42 and 43, respectively, may be conventional, i.e., such as axially aligned rotatable series of discs, each series displaying indicia in the respective windows and by which, with the "ON" button depressed, the rotation of each disc in each series will cause corresponding electrical impulses generated by conventional digital devices behind the panel 20 responding thereto to be transmitted through the appropriate circuits in the cable 46 to the appropriate receiving units of the computer.

The electrical impulses generated as a result of the selected settings of the numbered disks shown at 21 (hob r.p.m.), 41 (lead), 42 (feed) and 43 (no. of teeth) on the master control panel 20 in FIGURE 2 will be transmitted to the input of the computer C along the multiple cable 46 and delivered to the respective computer input units indicated at 21, 41, 42 and 43 in FIGURE 3 where these values are received, remembered, correlated, resolved and then dispatched by the computer to the servo-motors 50 and 51 to regulate the hydraulic motors 25 and 27 and the r.p.m. of the lead screw 39 and the work spindle 30, respectively, to the indicated selected values predetermined by the settings of the disk carried in the control panel.

In this manner, as disclosed hereinbefore, I have provided a simplified electrically actuated means for the synchronization of the relative motions of a rotary axis (work spindle or feed means) and a linear axis (lead) with the selected timed r.p.m. of the cutter or hob.

Since such conventional and well known disc operated digital devices may be employed, it is not deemed necessary to illustrate the same in the drawing. With the selected values delivered to the computer from the control panel, and with the electrical impulses being delivered to the computer by conductors 40 and 33 in response to rotation of the driven shafts 34 and 28, respectively, these separate respective values are correlated and resolved by the computer to correspond with the respective values indicated on the panel and are fed back via conductors 52 and 53, respectively, to the corresponding servo-motors 50 and 51 which, in turn, regulate the r.p.m. of the respective hydraulic motors 27 and 25 to the same values selected and displayed in the respective windows in the panel 20.

It will be seen, then, with the selected data transmitted from the panel to the computer, the resultant performances of the work spindle and lead screw will be controlled and maintained in strict synchronism with the data transmitted to the computer, and in timed relatation with the r.p.m. of the hob.

While I have shown and described an embodiment of my invention in terms wherein the main drive, such as the variable speed hydraulic motor 6, is mounted on the hob head and drives the hob or tool 14, it is to be understood that I do not limit the same in this respect since the main drive may be mounted to drive the lead screw or the work spindle in place of the hob. In such alternative arrangements, the overall operation of the system will not be affected since the timed relationship existing between the hob and the lead screw and work spindle can be maintained in either case. In such alternative arrangements, of course, such as where the main drive is through the lead screw 39 rather than through the hob, a feed back from the computer to the hob would be required but a feed back from the computer to the lead screw is eliminated and, where the main drive is through the work spindle rather than through the hob, a feed back from the computer to the work spindle would be eliminated, but feed backs to the hob and lead screw would be required.

Thus it will be seen that the r.p.m. of the unit driven by the main drive variable speed motor will require no feed back connection with the computer, but may be manually controlled from a control panel similar to that of FIGURE 2 through appropriate mechanical connection between the unit selected to be driven by the main drive and the respective control source on the panel.

I claim:

1. Control means for a machine tool having a plurality of driven members including a lead producing means, a workpiece carrier means and tool means for performing a working operation on a workpiece, comprising
   (1) fluid pressure means for driving the lead means and workpiece carrier means in timed relation with and for driving the tool means,
   (2) digital signal generating means responsive to the driven rates of said respective driven members,
   (3) digital signal generating means for preselecting the rate of movement of certain of said driven members,
   (4) means for receiving, correlating and computing said preselected signals and said signals responsive to the driven members,
   (5) and signal feed back means from the receiver to certain of the respective driven means and responsive to the respective correlated and computed signals whereby to synchronize and maintain the respective preselected relative rates of movement of certain of the drive means in timed relation with another of said driven means.

2. Control means for a machine tool having a plurality of driven members including a lead producing means, a workpiece carrier means, and tool means for performing a working cycle on a workpiece, comprising
   (1) fluid pressure means for driving the lead means and workpiece carrier means in timed relation with and for driving the tool means,
   (2) electronic signal generating means responsive to the respective driven rates of the tool, the lead and the work carrier means,
   (3) means for selecting the said rates of movement to be preselected,
   (4) electronic signal generating means for preselecting the rate of movement of the tool, the lead and the timed relationship between the tool and work carrier means,
   (5) a centralized means for electronically receiving, correlating and computing said preselected signals and said signals responsive to the driven members,
   (6) and electronic signal feed back means from the receiver to the workpiece carrier driving means, and lead driving means responsive to the respective correlated and computed signals whereby to synchronize and maintain the respective preselected relative rates of movement of the tool, lead and workpiece carrier means in timed relation.

3. Control means for a machine tool having a plurality of driven members including a cutter, a lead screw and a work spindle, said means comprising
   (1) fluid pressure means for driving the lead screw and work spindle in timed relation with and for driving the cutter,
   (2) electronic signal generating means responsive to the respective driven rates of the cutter, the lead screw and the work spindle,
   (3) digital signal generating means for preselecting the rates of movement of the cutter, the lead screw and said relationship between the cutter and work spindle,
   (4) means for selecting the said rates of movement to be preselected,
   (5) means for receiving, correlating and computing said preselected signals and said signals responsive to the driven members,
   (6) and signal feed back means from the receiver to the work spindle and lead screw driving means responsive to the respective correlated and computed signals whereby to maintain the preselected relative rates of movement of the cutter, lead screw and work spindle in timed relation.

4. Control means for a machine tool having a plurality of driven rotary members including a cutter, a lead screw and a work spindle, said means comprising
   (1) fluid pressure means for driving the cutter, the lead screw and work spindle in timed relation with and for driving the cutter,
   (2) a single source of fluid pressure for said fluid pressure driving means,
   (3) digital signal generating means responsive to the respective driven rates of the cutter, the lead screw and the work spindle,
   (4) signal generating means for preselecting the rate of rotation of the cutter, the lead screw and a timed rotational relationship between the cutter and work spindle,
   (5) means for receiving, correlating and computing said respective preselected signals and said respective signals responsive to the driven members,
   (6) and signal feed back means from the receiver to the work spindle and lead screw driving means responsive to the respective correlated and computed signals whereby to synchronize and maintain the preselected relative rates of rotation of the cutter, lead screw and work spindle in timed relation.

5. In combination with a hobbing machine having a hob, a lead screw and a work spindle,
   (1) fluid pressure means for driving the hob, lead screw and work spindle in timed relation,
   (2) a source of fluid pressure,
   (3) digital signal generating means responsive to the respective driven rates of the hob, lead screw and work spindle,
   (4) signal generating means for preselecting the rate of rotation of the hob, the lead screw and the rotational relationship of the hob with the work spindle,
   (5) means for receiving and correlating the respective signals of each of the said signal generating means,
   (6) signal feed back means independently connecting the receiver with the lead screw driving means and with the work spindle whereby to synchronize and maintain the preselected relative rates of rotation of the lead screw and the work spindle in timed relation with that of the hob,
   (7) and means responsive to said synchronized signals whereby to control the driven rates of the lead screw and the work spindle.

6. Control means for a machine tool having a tool, a lead screw and a work spindle, said means comprising
   (1) fluid pressure means for driving the tool, lead screw and work spindle in timed relation,
   (2) a single source of fluid pressure for said fluid pressure driving means,
   (3) digital signal generating means responsive to the respective driven rates of the tool, lead screw and work spindle,
   (4) signal generating means for preselecting the rate of rotation of the tool, the lead screw and a timed rotational relationship of the tool with the work spindle,
   (5) means for receiving and correlating the respective signals of each of the said signal generating means,
   (6) signal feed back means independently connecting the receiver with the lead screw driving means and with the work spindle whereby to synchronize and maintain the preselected relative rates of rotation of the lead screw and the work spindle in timed relation with that of the tool,
   (7) and means responsive to said synchronized signals whereby to control the driven rates of the lead screw and the work spindle.

7. A system for selecting and controlling a timed relationship between the rotational movements of a hob, a lead screw and a work spindle of a hobbing machine comprising
   (1) a source of fluid pressure,
   (2) fluid pressure responsive means for driving said lead screw and said work spindle in timed relation with and for driving the hob,
   (3) digital signal generating means responsive to the respective driven rates of the hob, the lead screw and the work spindle,
   (4) means for pre-selecting each of the several said driven rates,
   (5) digital signal generating means responsive to said selecting means,
   (6) means for receiving, correlating and computing the signals generated by the first and last named digital signal means,
   (7) signal feed back means independently connecting the receiver with the lead screw driving means and with the work spindle driving means whereby to synchronize and maintain the pre-selected relative rates of rotation of the lead screw and work spindle in timed relation with that of the hob, and
   (8) means responsive to said synchronized signals whereby to control the driven rates of the lead screw and work spindle.

References Cited by the Examiner

UNITED STATES PATENTS

| | | |
|---|---|---|
| 2,927,258 | 3/1960 | Lippel. |
| 2,964,252 | 12/1960 | Rosenberg. |
| 2,988,964 | 6/1961 | Van Acker _____ 90—4 |
| 3,015,806 | 1/1962 | Wang et al. |
| 3,024,610 | 5/1962 | Ulman _____ 318—162 X |
| 3,064,173 | 11/1962 | Breen et al. _____ 318—312 |

FOREIGN PATENTS

| | | |
|---|---|---|
| 1,114,501 | 12/1955 | France. |
| 829,824 | 4/1960 | Great Britain. |

WILLIAM W. DYER, Jr., *Primary Examiner.*

LEON PEAR, ANDREW R. JUHASZ, *Examiners.*

L. TAYLOR, *Assistant Examiner.*